United States Patent [19]

Takahashi et al.

[11] 4,046,183
[45] Sept. 6, 1977

[54] RADIAL TIRE HAVING A HIGHLY DURABLE BEAD STRUCTURE

[75] Inventors: Hidenori Takahashi, Tokorozawa; Hiroshi Tamura, Kunitachi; Shigeo Watanabe, Kokubunji; Toshiyuki Sogi, Higashi-Yamato, all of Japan

[73] Assignee: Bridgestone Tire Company Limited, Tokyo, Japan

[21] Appl. No.: 664,229

[22] Filed: Mar. 5, 1976

[30] Foreign Application Priority Data

Mar. 19, 1975 Japan .................................. 50-32159

[51] Int. Cl.$^2$ .......................... B60C 9/04; B60C 15/00
[52] U.S. Cl. ................................. 152/362 R; 152/354
[58] Field of Search ............. 152/354, 362 R, 362 CS, 152/355, 357, 374

[56] References Cited

U.S. PATENT DOCUMENTS

| | | | |
|---|---|---|---|
| 3,052,275 | 9/1962 | Hylbert, Jr. ................. | 152/362 R |
| 3,301,303 | 1/1967 | Travers ........................ | 152/362 R |
| 3,612,138 | 10/1971 | Ravenhall ................... | 152/362 R |
| 3,921,693 | 11/1975 | Suzuki et al. ............... | 152/362 R |

*Primary Examiner*—Drayton E. Hoffman

*Attorney, Agent, or Firm*—Sughrue, Rothwell, Mion, Zinn and Macpeak

[57] ABSTRACT

A radial tire having a highly durable bead structure, comprising a carcass ply having a high modulus of elasticity is disclosed. The bead is constructed to satisfy the following conditions, i.e., $$h_2 = (1/10 \text{ to } \tfrac{1}{2})h_0, \text{ and} \qquad (1)$$

$$d = (1/30 \text{ to } 1/5)D \qquad (2)$$

where $h_0$ is a vertical height of the upper end of a turn up portion of the carcass ply measured from a base of the bead, $h_2$ is a vertical distances from the upper end of the turn up portion of the carcass ply to the upper end of an inner reinforcing cord layer, after the tire has been mounted and inflated $d$ is an interlayer gauge of a space formed between the turn up portion of the carcass ply and an outer reinforcing cord layer and measured on a line passing through the upper end of the turn up portion of the carcass ply and perpendicular to the carcass ply and D is a thickness of that portion of the bead which is measured on said line. A rubber having a modulus of elasticity of 20 to 100 Kg/cm$^2$ at 100% elongation is inserted into said space.

10 Claims, 3 Drawing Figures

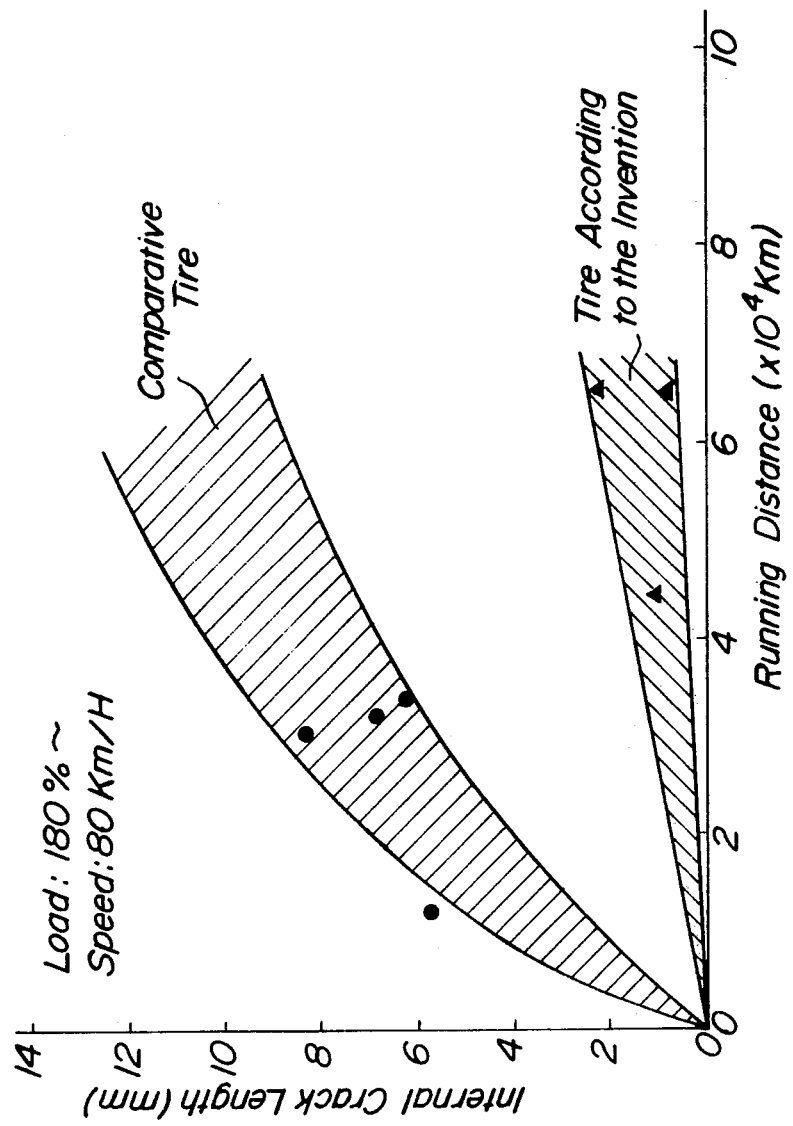

RADIAL TIRE HAVING A HIGHLY DURABLE BEAD STRUCTURE

This invention relates to radial tires having a highly durable bead structure and more particularly to a radial tire for trucks, buses, construction vehicles and the like having a highly durable bead structure, which comprises a carcass ply composed of a rubberized layer containing a plurality of cords each formed of material having a high modulus of elasticity such as a metallic wire.

Such a radial tire heretofore proposed comprises a carcass ply composed of a rubberized layer containing a plurality of mutually parallel cords each formed of material having a high modulus of elasticity such as a metallic wire and disposed in substantially radial planes and inclined at an angle of approximately 90° with respect to the equatorial line of the tire, the carcass ply being wound about each bead core from the inside toward the outside thereof and extended upwardly to form a turn up portion.

The turn up portion of the carcass ply is eventually covered by a reinforcing wire layer which constitutes a chafer, the cords of which are inclined with respect to tangential lines touching at a circle formed by the bead core.

In a radial tire having the above mentioned kind of bead, the bead construction results in a dislocation in rigidity at both the upper end of the turn up portion of the carcass ply and the upper end of the reinforcing wire layer and this dislocation in rigidity tends to induce crack failure in the peripheral direction of the tire.

As mentioned, the carcass ply of the radial tire is composed of a rubberized layer containing a plurality of cords disposed in the radial direction, so that the sidewalls of the tire are extremely flexible. As a result, the sidewalls are liable to be considerably deflected in a direction parallel to the rotational axis of the tire. The amount of deformation of the tire during one rotation thereof is far larger than that of a bias tire.

Therefore, large repeated strain is subjected to the bead located at the base of the sidewalls of the radial tire under service conditions.

If the upper end of the turn up portion of the carcass ply is located at a position which is far lower than the upper end of a flange of a rim, there is a risk of the carcass ply slipping out of the bead core. Conversely, if the upper end of the turn up portion of the carcass ply is located at a position which is higher than the maximum width position of the tire, a large movement of the carcass ply resulting from rotation of the tire immediately induces tire separation failure. As a result, the upper end of the turn up portion of the carcass ply is required to be located at a position which is far lower than the maximum width position of the sidewall.

In the conventional radial tire constructed as above described, both the upper ends of the turn up portion of the carcass ply and the reinforcing layer are simply located at the position of the tire which is subjected to considerably large strain and the modulus of elasicity of both the carcass ply and the reinforcing layer is significantly different from that of rubber. As a result, the upper ends of the turn up portion of the carcass ply and the reinforcing layer are subjected to a large repeated strain that tends to induce separation between said upper ends and rubber which results in tire crack failure.

In an effort to alleviate such tire crack failure induced at the upper portion of the head, at least one attempt has been made to employ at least two rubberized reinforcing cord layers each composed of a plurality of reinforcing fibers such as nylon embedded therein and extending from the base of the bead through the sidewalls up to near the maximum width position of the tire and completely covering both the turn up portion of the carcass ply and the reinforcing wire layer.

Such bead construction in capable of significantly improving the durability of the bead of the tire.

Such prior art bead construction, however, is not sufficient to provide a radial tire bead construction which can widthstand separation between both the upper end of the turn up portion of the carcass ply and the upper end of the reinforcing wire cord layer on the one hand and rubber on the other hand and which can further improve the wear resistant property of the tire and use the tire for a long time under service conditions of long distance running.

The present invention is intended to provide a tire bead construction which can suitably be applied to a radial tire which comprises a carcass ply composed of a rubberized layer containing a plurality of organic or inorganic fiber cords embedded therein and having a high modulus of elasticity larger than $4 \times 10^5$ Kg/cm$^2$ and which can reliably prevent separation failure induced at both the upper end of the turn up portion of the carcass ply and the upper end of the reinforcing wire cord layer owing to a considerable difference between the modulus of elasticity of the fiber cord and that of rubber. The problem has not been encountered with cords formed of polyamide, polyester fiber and the like having a low modulus of elasticity.

The reinforcing cord layer is required to not only refrain the bead as a whole from deformation under load conditions, but also prevent that portion of the bead member which is urged against and compressed by the rim from local deformation. In accordance with the invention, in order to permit the reinforcing cord layer to satisfy the above mentioned requirements, each of the cords of the inner reinforcing layer is formed of material having a high modulus of elasticity of at least $4 \times 10^5$ Kg/cm$^2$ and each of the cords of the remaining reinforcing cord layers is formed of material having a low modulus of elasticity of at most $2 \times 10^5$ Kg/cm$^2$.

The reinforcing cord layer is capable of restraining the turn up portion of the carcass ply from separation. Between the carcass ply and the reinforcing cord layers, however, is produced an interlayer shearing strain which is inversely proportional to an interlayer gauge defined by a distance between the turn up portion of the carcass ply and the reinforcing cord layers. This interlayer shearing strain also induces tire separation failure. In order to alleviate such interlayer shearing strain, a rubber layer might be sandwiched between the turn up portion of the carcass ply and the reinforcing cord layers.

The presence of the rubber layer sandwiched between the carcass ply and the reinforcing cord layers, however, causes the bead as a whole to increase its thickness by the thickness of the rubber layer, and as a result, heat is accumulated in the bead. Heat accumulation can itself lead to tire separation failure.

Another attempt has been made to make the thickness of the rubber layer sandwiches between the turn up portion of carcass ply and the reinforcing cord layer large by inclining the turn up portion of the carcass ply at an angle of approximately 90° with respect to the rotational axis of the tire. However, if vertical load is repeatedly subjected to the tire under service conditions so as to incline the carcass ply, a horizontal component force of the load causes the tire to be outwardly displaced, while a vertical component force of the load is applied in a direction opposed to the direction of the turn up portion of the carcass ply so as to create a frotrusion in the turn up portion of the carcass ply, thereby accelerating separation failure at the upper end of the turn up portion of the carcass ply. As a result, the carcass ply is wound about the bead core from the inside toward the outside and then is required to be extended upwardly in a direction which is substantially parallel with the carcass ply.

An object of the invention, therefore, is to provide a radial tire having a highly durable bead, which features and employs a novel bead construction.

Another object of the invention is to provide a radial tire having a highly durable bead, which has an of improved separation resistant property and improved overall durability under service conditions.

A further object of the invention is to provide a radial tire having a highly durable bead, which can prevent separation failure between rubber and upper ends of both the turn up portion of a carcass ply and the reinforcing layer without degrading any chafing faculty between the tire and the rim.

A still further object of the invention is to provide a radial tire having a highly durable bead, which can increase an interlayer gauge and hence prevent separation failute at both the upper end of a turn up portion of a carcass ply and the upper end of a reinforcing layer and without chafing.

A feature of the invention is the provision of a radial tire having a highly durable bead, which comprises, a carcass ply composed of a rubberized layer containing a plurality of cords parallel to one another and disposed in radial relationship with respect to the equatorial line of the tire and, at least two reinforcing cord layers covering that portion of the carcass ply which is wound about a bead core from the inside toward the outside thereof and extended upwardly to form a turn up portion and each composed of a plurality of cords inclined with respect to tangential lines touching at a circle formed by the bead core, and in which the upper end of at least one inner layer of the reinforcing cord layers is located at a position which is lower than the upper end of the turn up portion of the carcass ply by $(1/10 \text{ to } \frac{1}{3})h_0$ where $h_0$ is a vertical height of the upper end of the turn up portion of the carcass ply measured from a base of the bead, a space formed between the turn up portion of the carcass ply and a reinforcing cord layer exclusive of the inner reinforcing cord layer has an interlayer gauge measured on a line passing through the upper end of the turn up portion of the carcass ply and perpendicular to the carcass ply and defined by $(1/30 \text{ to } 1/5)D$ where $D$ is a thickness of that portion of the bead which is measured on said line, and a rubber having a modulus of elasticity of 20 to 100 Kg/cm² at 100% elongation is inserted into said space. It is preferable that the modulus of elasticity of the rubber of the interlayer is higher than that of rubber of a stiffener located near the turn up end of the carcass ply and is of the order of 40 to 60 Kg/cm² when the modulus of elasticity of the stiffener is 15 to 20 Kg/cm².

In one embodiment of the invention, the inner reinforcing cord layer is composed of a plurality of cords each formed of material having a high modulus of elasticity of at least $4 \times 10^5$ Kg/cm² and each of the remaining reinforcing cord layers is composed of a plurality of cords each formed of material having a low modulus of elasticity of at most $2 \times 10^5$ Kg/cm².

The invention will now be described in greater detail with reference to the accompanying drawings, wherein:

FIG. 3 is a graph showing a plot of internal crack length at the upper portion of a bead for radial tires built in accordance with the invention as a function of running distance and compared with that for the tires of the kind shown in FIG. 2.

Figure 1:
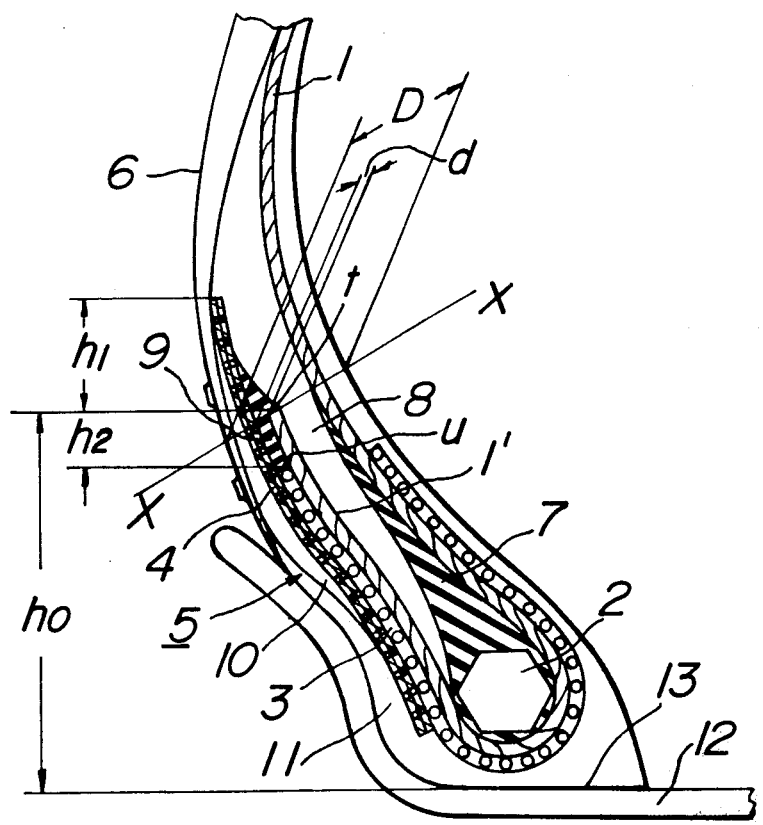
FIG. 1 is a cross-sectional view of one-half of a radial tire embodying the present invention.

Referring to FIG. 1, reference numeral 1 designate a carcass ply composed of a rubberized layer containing a plurality of steel cords disposed in radial relationship with respect to the equatorial line of the tire and having a high modulus of elasticity of preferably $4 \times 10^5$ Kg/cm². Both ends of the carcass ply 1 are wound about bead cores 2, 2 from the inside toward the outside thereof to form a turn up portion 1' and secured to bead members 5, 5, respectively.

The portions of the carcass ply 1 which are wound about the bead cores 2, 2 and the turn up portions 1', 1' of the carcass ply 1 are covered by a reinforcing cord layer 3 composed of steel cords which are the same as those used for the carcass ply 1 and having an upper end $u$ located below an upper end $t$ of the turn up portion 1' of the carcass ply 1, the turn up portion 1' being wound about a bead core 2 and extended upwardly therefrom.

A reinforcing cord layer 4 composed of a plurality of nylon cords is disposed outside the reinforcing cord layer 3 so as to entirely cover the upper end $u$ thereof. The reinforcing cord layer 4 is extended upwardly from a base portion of the head 5 toward an upper portion of a side wall 6. The reinforcing cord layer 3 will now be called as an inner reinforcing cord layer and the reinforcing cord layer 4 as an outer reinforcing cord layer.

Inside the turn up portion 1' of the carcass ply 1 is disposed a first stiffener 7 composed of rubber having a hardness which is equal to or greater than the hardness of case rubber.

The first stiffener 7 is formed into an elongate triangle in cross section whose base portion is the largest in thickness and surrounds the bead core 2, while the upper portion thereof is gradually decreased in thickness and extended upwardly toward a position which is slightly higher than the upper end $t$ of the wind back portion 1' of the carcass ply 1.

A second stiffener 8 is sandwiched between the first stiffener 7 and the turn up portion 1' of the carcass ply 1 and the outer reinforcing cord layer 4 and is extended along the carcass ply 1 toward a position which is slightly below the maximum width position of the tire. The second stiffener 8 is the largest in thickness near the upper end $t$ of the turn up portion 1' of the carcass ply 1, the thickness being gradually decreased in both the upward and downward directions.

Provision is made of an interlayer rubber 9 surrounded by all of the outer reinforcing cord layer 4, the second stiffener 8 and the turn up portion 1' of the carcass ply 1 and bonded firmly to the upper end $u$ of the inner reinforcing cord layer 3, said interlayer rubber 9 being extended from the lower portion of the upper end of the turn up portion 1' of the carcass ply 1 to the upper portion thereof.

On the outer reinforcing cord layer 4 is disposed a third stiffener 10 composed of rubber which is the same as that of the second stiffener 8 and having a thickness which is gradually decreased from a position near the upper end of a flange of a rim 12 toward upper and lower ends of the third stiffener 10.

On the outside of the third stiffener 10 is disposed a rubber chafer 11 composed of a hard rubber and covering the bead 5 of the tire.

A pneumatic tire having a size of 10.00 R 20 and having the bead constructed as above described was manufactured on the basis of the following dimensions, with the tire mounted and inflated to a normal pressure;

$H = 240$ (mm)
$H_0 = 63$ (mm) $(= 1/3.8\ H)$
$h_1 = 30$ (mm) $(= 1/2.1\ h_0)$
$h_2 = 10$ (mm) $(= 1/6.3\ h_0)$
$D = 25$ (mm)
$d = 2.5$ (mm) $(= 1/10\ D)$

Modulus of elasticity of inner layer rubber at 100% elongation = 42 Kg/cm$^2$ $H$ is a vertical height of the tire from the base surface of the head to the inner surface of the tire at the crown center.

The outer reinforcing cord layer 4 was composed of two rubberized fabrics each containing bias-laid nylon cords of 1260 d/2, the number of cords being 41.1 per 50 mm of the fabric and the cords being inclined 60° with respect to the equatorial line of the tire.

The inner reinforcing cord layer 3 was composed of a rubberized fabric containing steel cords of 7×3+1 (filament diameter is 0.175 mm), the number of cord being 26.0 per 50 mm and the cords being inclined 60° with respect to the equatorial line of the tire.

Figure 2:
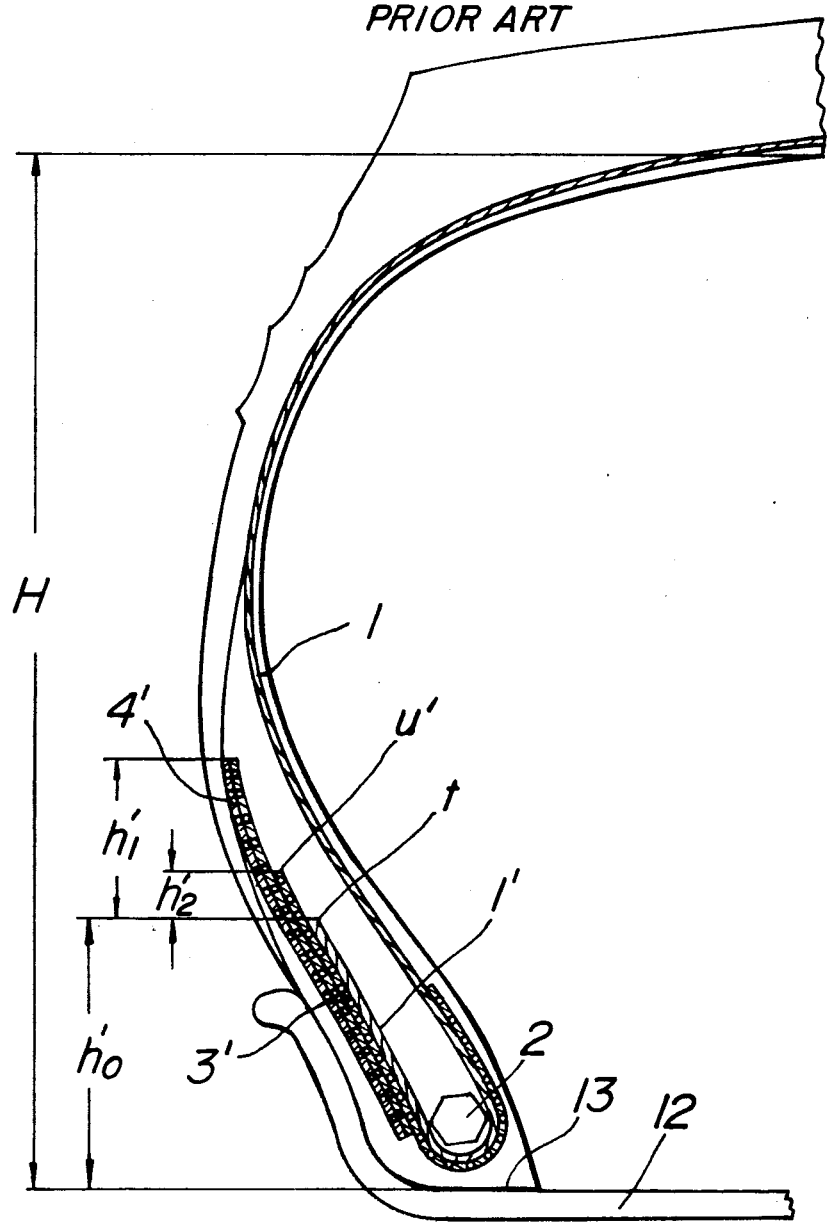
FIG. 2 is a cross-sectional view of one-half of a prior art radial tire which is shown for the sake of comparison with the tire shown in FIG. 1.

For purposes of comparison, a tire shown in FIG. 2 was manufactured on the basis of the following dimensions.

The vertical height $H$ of the tire is the same as that of the above mentioned tire of 10.00 R 20
$h_0 40 = 52$ (mm)
$h_1' = 41$ (mm)
$h_2' = -11$ mm $h_2' = -11$ mm means that the upper end $u'$ of the inner reinforcing cord layer 3' is located at a position which is higher than the upper end $t'$ of the turn up portion 1'' of the carcass ply 1' by $h_2' = 11$mm.

Experimental tests on the radial tire according to the invention shown in FIG. 1, comparative radial tire shown in FIG. 2 and a conventional radial tire yielded the following results.

1. Drum test

Running time leading to tire bead failure was indicated by an index 100 for the conventional tire. Indexes obtained for the tire according to the invention and for the comparative tire are as follows.

| | |
|---|---|
| Tire according to the invention | 250 |
| Comparative tire | 150 |
| Conventional tire | 100 |

2. Practical running test

Lengths of separation failure in radial direction of tires induced after the tires have travelled 50,000 Km were measured. The lengths measured for the tire according to the invention, for the above mentioned comparative tire and for the conventional tire are as follows:

| | |
|---|---|
| Tire according to the invention | Shorter than 2 mm |
| Comparative tire | 7 to 11 mm |
| Conventional tire | Longer than 20 mm |

The conventional tire shown in the above tables made use of a bead construction which comprises only one reinforcing cord layer composed of steel wires and extending so as to cover the outside of the upper end of the turn up portion of the carcass ply.

In FIG. 3 are shown results obtained from practical running tests in which internal crack lengths induced in tires according to the invention and comparative tires were measured at various running distances shown by ▲ for the tires according to the invention and by • for the comparative tires when the tires run at a speed of 80 Km/H under over load of at least 180% with respect to the standard load. As seen from FIG. 3, the internal crack lengths induced in the comparative tires are considerably longer than those induced in the tires constructed according to the invention.

In accordance with the invention, it is preferable to determine a vertical height $h_0$ of the upper end $t$ of the turn up portion 1' of the carcass ply 1 from a base surface 13 of the head member $t$ by ($\frac{1}{8}$ to $\frac{1}{2}$)$H$, $H$ being a vertical height of the tire from the base surface 13 of the bead 5 to the inner surface of the tire at the crown center.

If the vertical height $h_0$ is extremely low, there is a risk of the carcass ply 1 slipping out of the bead core 2. As a result, the upper end $t$ of the turn up portion 1' of the carcass ply 1 is required to be at a position whose height is at least equal to a height of the flange of the rim 12. If a rim of 700T, for example, is used, it is preferable to determine a ratio $h_0/H$ by $$h_0/H \geqq 1/6.3.$$

If the upper end $t$ of the turn up portion 1' of the carcass ply 1 is extended up to near or beyond the maximum width portion of the tire, the upper end $t$ is liable to be subjected to separation failure owing to the fact that the carcass ply 1 becomes considerably displaced during rotation of the tire.

The upper end $u$ of the inner reinforcing cord layer 3 is located at a position which is lower than the upper end $t$ of the turn up portion 1' of the carcass ply 1 by a vertical distance $h_2$ which is given by $$h_2 = 1/10 \text{ to } \tfrac{1}{2})h_0.$$

As a result, between the turn up portion 1' of the carcass ply 1 and the outer reinforcing cord layer 4 is a space having a large interlayer gauge $d$ in which an interlayer ruffer 9 is inserted having a modulus of elasticity of 20 to 100 kg/cm$^2$ at 100% elongation. It is preferable that the modulus of elasticity of the rubber of the interlayer is higher than that of a stiffener rubber located near the turn up end of the carcass ply cord and is of the order of 40 to 60 Kg/cm$^2$. The use of the interlayer rubber 9 makes it possible to decrease interlayer shearing strain subjected to the turn up portion 1' of the carcass ply 1 on the one hand and to the inner and outer reinforcing cord layers 3, 4 on the other hand and provides the important advantage that the upper end $t$ of the turn up portion 1' of the carcass ply 1 is prevented from being subjected to separation failure, thereby significantly improving the separation resistant property of the tire.

If the upper end $u$ of the inner reinforcing cord layer 3 is located at a position which is considerably lower than the upper end of the rim flange, the rigidity of that portion of the bead which is urged against and compressed by the rim 12 becomes small, and as a result, the rubber chafer 11 is liable to be chafed with respect to the rim 12. Thus, it is desirous to locate the upper end $u$ of the inner reinforcing cord layer 3 at a position which is considerably higher than the upper end of the rim flange.

In addition, it is preferable to extend upwardly the outer reinforcing cord layer 4 from the upper end $t$ of the turn up portion 1' of the carcass 1 up to an upper side wall portion by a vertical distance $h_1$ which is equal to $(1/5$ to $2)h_0$.

All of the above mentioned values for the dimensions $H$, $h_0$, $h_1$ and $h_2$ are of those when a standard internal pressure is applied to the tire.

It is preferable to determine the above mentioned interlayer gauge $d$ to a value given by $$(1/30 \text{ to } 1/5)D.$$

where $D$ is that thickness of the bead 5 which is measured on a line X—X passing through the upper end $t$ of the turn up portion 1' of the carcass ply 1 and perpendicular to the carcass ply 1, the interlayer gauge $d$ being also measured on the perpendicular line X—X.

The absolute value of the interlayer gauge $d$ is required to be 1.5 to 5 mm.

If the interlayer gauge $d$ is smaller than 1.5 mm, the interlayer rubber 9 is liable to be separated from the upper end $t$ of the turn up portion 1' of the carcass ply 1. On the contrary, if the interlayer gauge $d$ is larger than 5 mm, that would induce separation failure.

The radial carcass ply 1 is composed of a rubberized fabric containing a plurality of cords embedded therein, each having a high modulus of elasticity of at least $4 \times 10^5$ Kg/cm$^2$, such as glass, metal, Kevlar and the like. Kevlar is a trade name used by Du Pont Co. in U.S.A. for polyamide fiber having a high modulus of elasticity.

Each of the inner and outer reinforcing cord layers 3, 4 may be composed of a rubberized fabric containing the same kind of cords embedded therein. It is preferable, however, to use the inner reinforcing cord layer 3 composed of a rubberized fabric containing cords each having a high modulus of elasticity, such as glass, Kevlar, metal and the like and the outer reinforcing cord layer 4 composed of two rubberized fabrics each containing cords each having a low modulus of elasticity, such as polyamide fiber, polyester fiber and the like.

The use of the inner reinforcing cord layer 3 having a high modulus of elasticity permits the bead 5 to be firmly surrounded by the inner reinforcing cord layer 3, thereby sufficiently preventing chafing of the rubber chafer 11 with respect to the rim 12.

In addition, the use of the outer reinforcing cord layer 4 extending toward the upper portion of the side wall of the tire and composed of rubberized fabrics each containing polyamide fiber, polyester fiber, polyvinyl alcohol fiber, particularly polyamide (nylon) fiber whose modulus of elasticity is at most $2 \times 10^5$ Kg/cm$^2$, which is more or less extensible and excellent in antifatigue property, is capable of improving the separation resistant property of the tire.

As stated hereinbefore, the invention is capable of eliminating the disadvantage of the radial tire, particularly, the radial tire which makes use of the carcass ply and the reinforcing layer both having a high modulus of elasticity that separation failure between rubber and upper ends of both turn up portion of a carcass ply and reinforcing layer disposed outside the turn up position of the carcass ply results in crack failure at those portions of the bead, thereby considerably improving the durability of the reinforced bead of the radial tire.

What is claimed is:

1. A radial tire having a highly durable bead structure, comprising a carcass ply composed of a rubberized layer containing a plurality of cords parallel to one another and disposed in radial relationship with respect to the equatorial line of the tire and at least two inner reinforcing cord layers covering that portion of the carcass ply which is wound about a bead core from the inside toward the outside thereof and extended upwardly to form a turn up portion and each composed of a plurality of cords inclined with respect to tangential lines touching at a circle formed by the bead core, in the tire the upper end of at least one of the inner reinforcing cord layers is located at a position which is lower than the upper end of the turn up portion of the carcass ply by $(1/10$ to $\frac{1}{2})h_0$ where $h_0$ is a vertical height of the upper end of the turn up portion of the carcass ply measured from a base of the bead, a space formed between the turn up portion of the carcass ply and a reinforcing cord layer exclusive of said reinforcing cord layer has an interlayer gauge $d$ measured on a line passing through the upper end of the turn up portion of the carcass ply and perpendicular to the carcass ply and defined by $d = (1/30$ to $1/5)D$ where $D$ is a thickness of that portion of the bead which is measured on said line, where $h_0$, $d$ and $D$ are measured after the tire has been mounted and normally inflated, and a rubber having a modulus of elasticity of 20 to 100 Kg/cm$^2$ at 100% elongation is inserted into said space.

2. A radial tire having a highly durable bead structure as claimed in claim 1, wherein said inner reinforcing cord layer includes a plurality of cords each formed of material having a high modulus of elasticity of at least $4 \times 10^5$ Kg/cm$^2$ and each of said remaining reinforcing cord layers includes a plurality of cords each formed of material having a low modulus of elasticity of at most $2 \times 10^5$ Kg/cm$^2$.

3. A radial tire having a highly durable bead structure as claimed in claim 1, wherein said vertical height $h_0$ of said upper end of the turn up portion of the carcass ply is defined by $$h_0 = (\tfrac{1}{8} \text{ to } \tfrac{1}{2})H$$

where $H$ is a vertical height of the carcass ply measured from the base of said bead measured after the tire has been mounted and normally inflated.

4. A radial tire having a highly durable bead structure as claimed in claim 3, wherein a ratio of $h_0/H$ is defined by $$h_0/H \geqq 1/6.3$$

for a rim of 700T.

5. A radial tire having a highly durable bead structure as claimed in claim 1, wherein said outer reinforcing cord layer is extended upwardly from the upper end of said turn up portion of the carcass ply by a vertical distance $h_1$ measured after the tire, has been mounted and normally inflated which is defined by $$h_1 = (1/5 \text{ to } 2)h_0.$$

6. A radial tire having a highly durable bead structure as claimed in claim 1, wherein said interlayer gauge $d$ is defined by $$d = 1.5 \text{ to } 5 \text{ mm}.$$

7. A radial tire having a highly durable bead structure as claimed in claim 1 and further comprising a first stiffener disposed inside said turn up portion of the carcass ply and formed into an elongate triangle in cross section and having a base portion surrounding said bead core and an upper end located at a position slightly higher than the upper end of the turn up portion of the carcass ply, a second stiffener sandwiched between said first stiffener on the one hand and said turn up portion of the carcass ply and said outer reinforcing cord layer on the other hand and extending along the carcass ply toward a position which is slightly below the maximum width position of the tire, a third stiffener disposed on said outer reinforcing cord layer and having a thickness which is gradually decreasing from a position near the upper end of a rim flange toward upper and lower ends of said third stiffener, and a rubber chafer disposed on said third stiffener and covering said bead of the tire.

8. A radial tire having a highly durable bead structure as claimed in claim 1, wherein said cord of the carcass ply is formed of glass, metal or polyamide, said cord of the inner reinforcing cord layer is formed of glass, metal or polyamide, and said cord of the outer reinforcing cord layer is formed of nylon, polyester or polyvinyl alcohol.

9. A radial tire having a highly durable bead structure as claimed in claim 1, wherein the modulus of elasticity of the rubber of the interlayer is higher than that of rubber of a stiffener located near the turn up end of the carcass ply.

10. A radial tire having a highly durable bead structure as claimed in claim 9, wherein said modulus of elasticity of the rubber of the interlayer is of the order of 40 to 60 Kg/cm².

* * * * *